Patented June 20, 1939

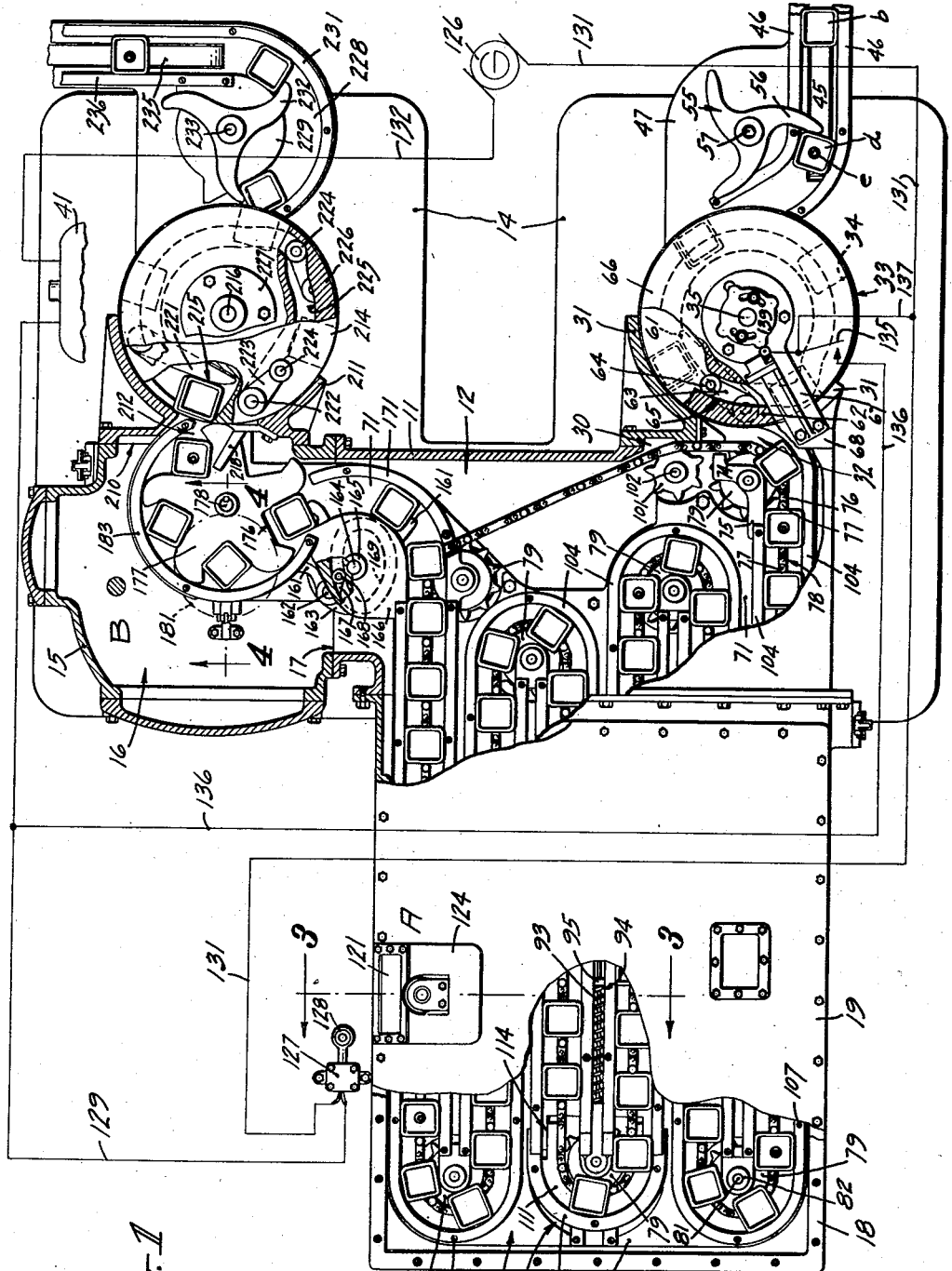

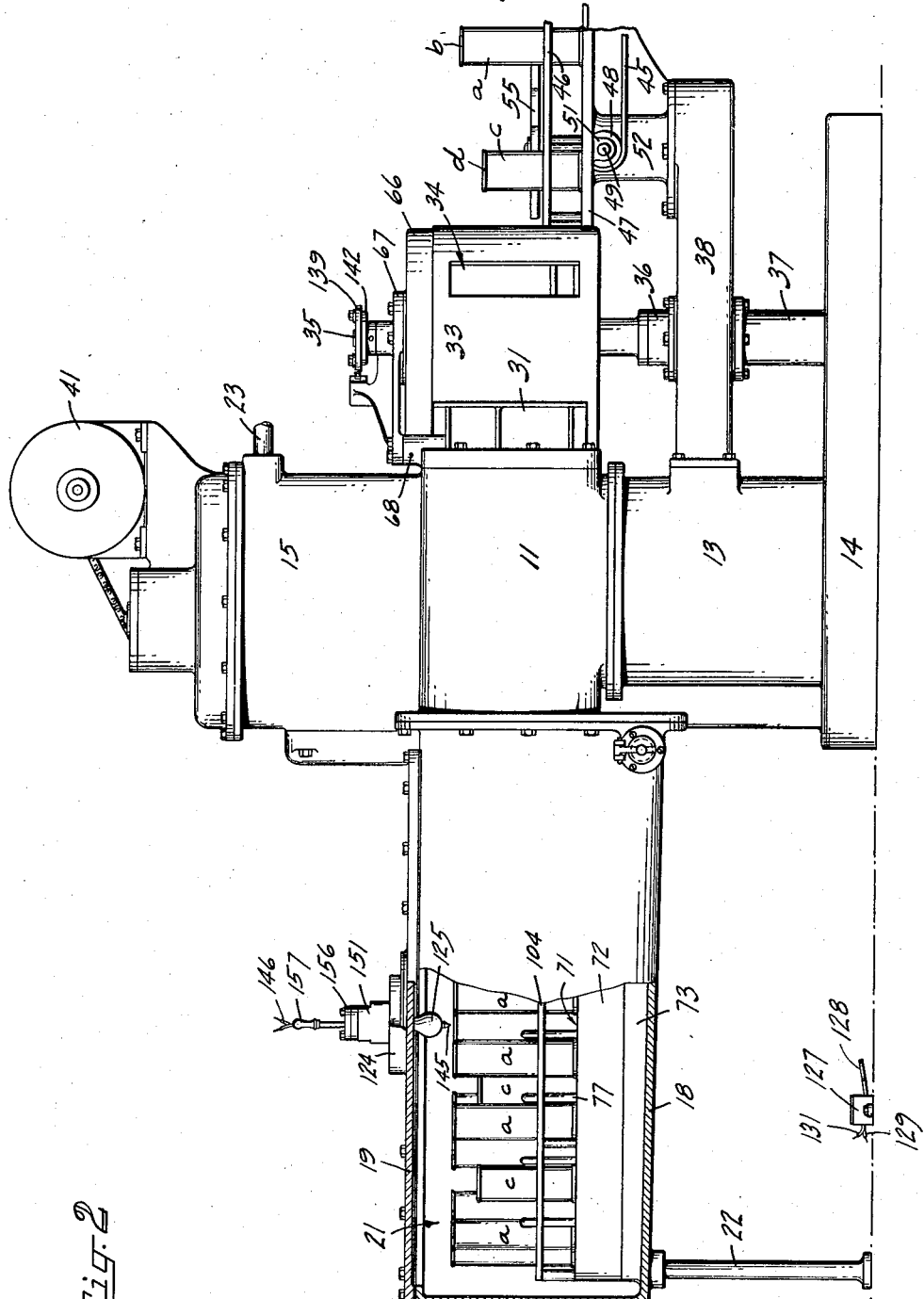

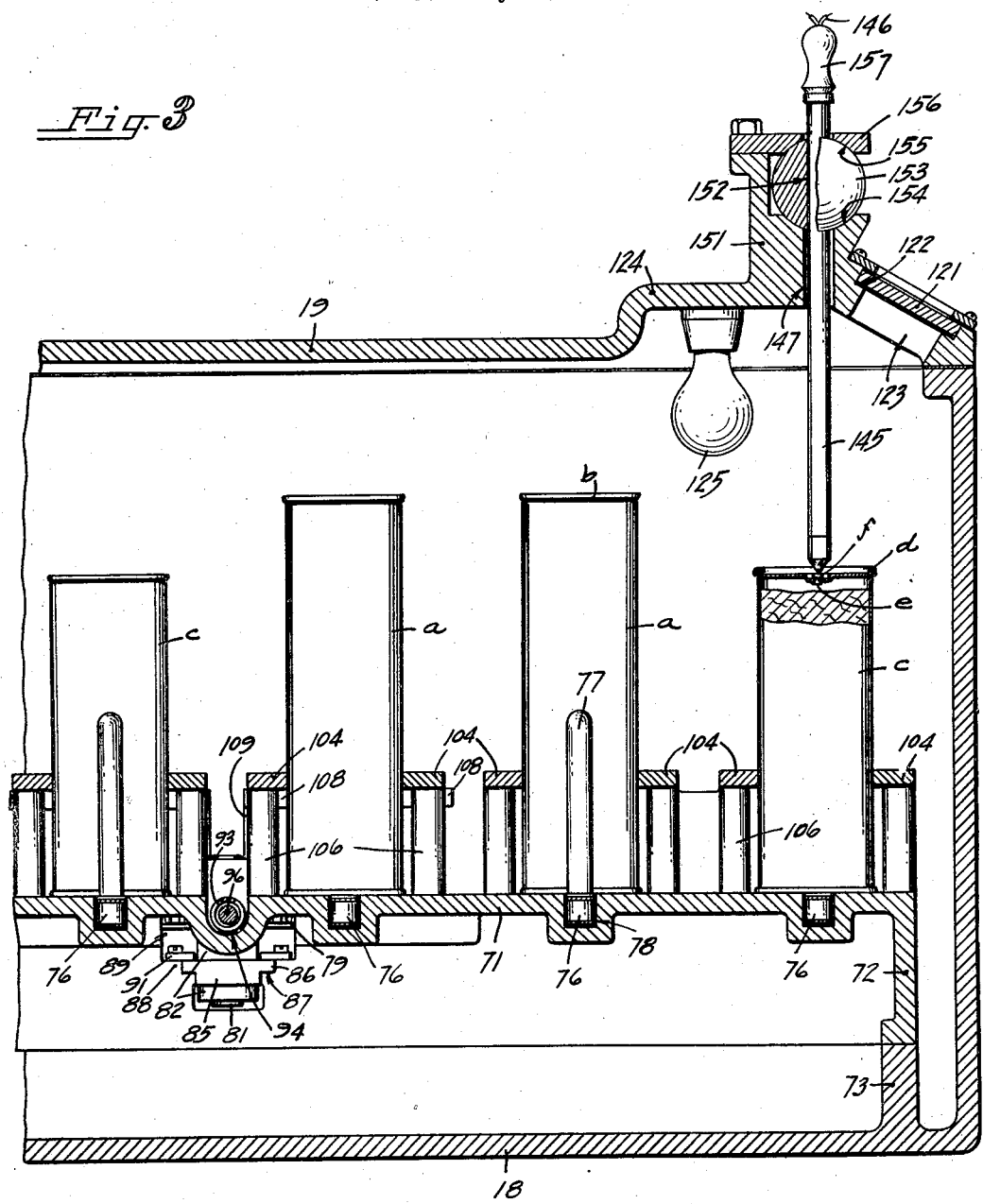

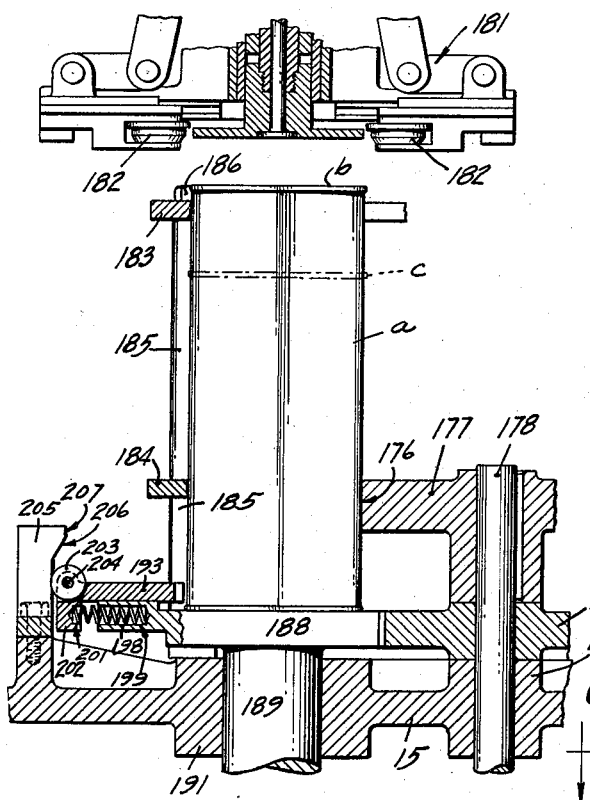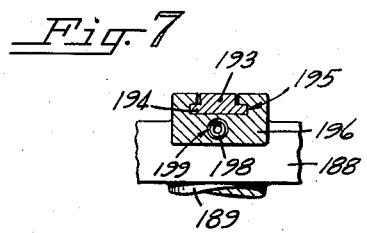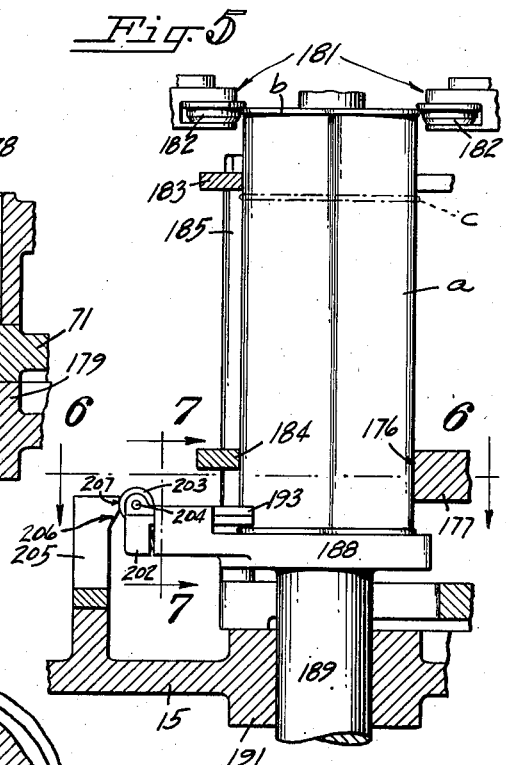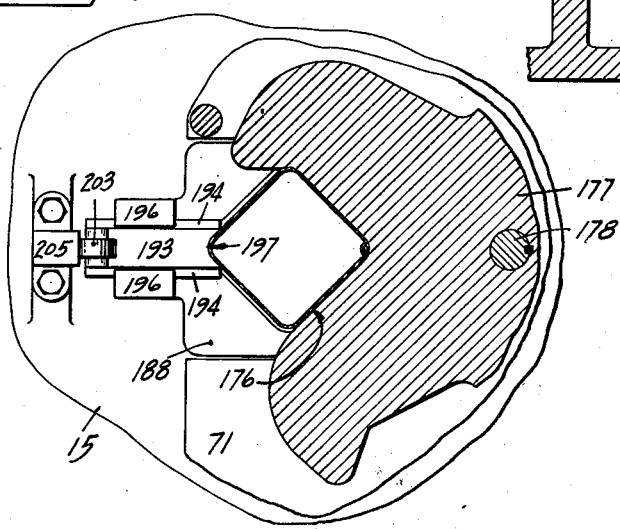

2,162,768

UNITED STATES PATENT OFFICE 2,162,768

CONTAINER-SEALING MACHINE

Clifford Titchen, Livingston, and Wilhelm Boehl, Union, N. J., assignors to American Can Company, New York, N. Y., a corporation of New Jersey Application July 27, 1935, Serial No. 33,612

11 Claims. (Cl. 113—82)

The present invention relates to a machine or apparatus for sealing or closing containers under other than normal atmospheric conditions, such as for example a vacuum and has particular reference to devices for simultaneously handling and sealing, while under a vacuum or other abnormal atmospheric condition, containers of different types and dimensions and requiring different kinds of sealing operations.

In the packing or filling of products into containers, small job lots of the same product are sometimes run off or packed simultaneously with the large standard lots. These small lots are usually packed in shorter or otherwise different size containers than the standard lot containers. Ordinarily these odd lot jobs are manually handled, and where vacuumizing is required individual containers after filling are set aside until they have accumulated in sufficient numbers to make it convenient or profitable to start up a vacuum closing machine to seal them, or they are vacuum sealed in separate vacuum closing machines which adds considerably to the expense of packing these odd size containers.

The present invention contemplates the cooperative vacuumizing and sealing of these odd size or short containers in the same machine and simultaneously with the taller or standard lot containers so as to effect greater efficiency and economy in the handling and sealing of such containers. As the short containers are filled, a cover having a vent hole, is secured in place on each container and it is immediately placed in the line of tall containers entering the vacuum sealing machine. These containers are vacuumized through the vent hole which is then solder sealed while under vacuum in what is commonly known as a solder tipping operation. The tall containers are provided with previously loosely applied covers which permit of vacuumizing the container head space and contents, the cover being seamed in place while under vacuum. Thus a plurality of sizes and types of containers are vacuumized and sealed in a different manner but in the same machine.

It is therefore an object of the invention to provide a machine or apparatus for sealing or closing containers under vacuum wherein containers of different dimensions and requiring different sealing operations are simultaneously moved through the machine in a continuous procession and sealed therein, thereby eliminating separate machines and saving floor space and time and increasing operating efficiency and speed.

Another object is the provision of such a universal machine or apparatus wherein selected containers may be sealed by a soldering or solder tipping operation and other containers may be sealed by a seaming operation or where all containers may be sealed by soldering, solder tipping and seaming, all of these sealing operations being cooperatively performed in the same machine or apparatus and while under other than normal atmospheric conditions.

Another object is the provision of a machine of the character described wherein a complete sealing operation performed on selected containers may be effected manually, while a complete sealing operation performed on other containers may be effected entirely automatically, or part of a sealing operation on all containers may be done manually and a part automatically, such a machine lending itself to a number of other combinations or variations of construction and operation.

Numerous other objects and advantages of the invention will be apparent as it is better understood from the following description, which, taken in connection with the accompanying drawings, discloses a preferred embodiment thereof.

Referring to the drawings:

Figure 1 is a plan view of a machine embodying the instant invention, parts being broken away, the view also schematically illustrating a wiring diagram of the electric circuits utilized in the machine;

Fig. 2 is a side elevation of the machine with parts broken away;

Fig. 3 is an enlarged fragmentary transverse sectional view taken substantially along the line 3—3 in Fig. 1;

Fig. 4 is an enlarged fragmentary sectional view taken substantially along the line 4—4 in Fig. 1;

Fig. 5 is a sectional view similar to Fig. 4 showing the container lifting mechanism and seaming rolls in container closing position;

Fig. 6 is a fragmentary horizontal sectional view taken substantially along the line 6—6 in Fig. 5; and Fig. 7 is a fragmentary vertical sectional view taken substantially along the line 7—7 in Fig. 5.

The containers or cans to be vacuum sealed are introduced into the apparatus by a belt conveyor and in a continuous promiscuous procession comprising both tall and short cans. The machine end of the conveyor terminates adjacent a rotating valve having can pockets into which the cans are individually delivered by a rotating star-wheel. The valve is disposed in an entrance opening of a casing providing an extensive vacuum chamber into which the cans are carried as the valve rotates, being discharged into the chamber from the can pockets at the proper time.

In the chamber the cans are received on an endless chain conveyor which carries them along a circuitous path of travel in order to provide sufficient time for the vacuumizing of the container head space and the contents. It should be understood, however, that if the product packed in the containers is of a very compact nature, it may be desirable to pre-vacuumize the product before packing so as to insure that a thorough vacuumizing of both product and container is effected.

Near the end of the path of travel the cans are carried under a solder tripping mechanism located within the chamber at a station A (Fig. 1) but manually operated from the chamber exterior. Here an operator inspecting the cans, through a window in the casing, as they pass the station observes a short can as it approaches and seals it as it passes or stops the machine when it is within reach of the tipping mechanism for the sealing operation. These cans are sealed by melting and spreading over the vent hole a drop of solder carried on the can cover adjacent the hole.

After passing the station A, the cans are directed away from the chain conveyor and are engaged by a cam actuated feeding device which moves them into a rotating turret associated with a seaming mechanism B which is also housed within the vacuum chamber. The turret conveys all the cans individually to a suitable seaming head where the loosely applied covers on the tall cans are seamed in position. As at the solder tipping mechanism all cans pass under this seaming head but only the tall cans are closed, the short cans already closed by solder tipping being too short to reach the head are passed through without being operated upon.

The turret then further conveys the now fully vacuumized and sealed cans to a rotating exit valve similar in construction and operation to the entrance valve and which is disposed in an exit opening of the vacuum chamber casing. The cans are individually placed into pockets of the valve and are carried out of the chamber as the valve rotates, being discharged onto a table and into the path of a rotating star-wheel. The star-wheel engages the discharged cans and moves them onto a belt conveyor which carries them to any suitable place of deposit.

A preferred form of apparatus which is disclosed in the drawings and in which one preferred embodiment of the invention is illustrated comprises in part a rectangular, transversely disposed, horizontal casing 11 (Figs. 1 and 2) which encloses a chamber 12. One end of the casing is supported on a pedestal 13 which in turn is secured to a base 14. The other end of the casing is bolted to a side of a housing 15 of a suitable can sealing mechanism herein illustrated as a double seaming mechanism which is supported on a part of the base 14. The housing 15 rises above the casing 11 and encloses a chamber 16 in which the seaming instrumentalities B are disposed. The engaged side of the housing is provided with an opening 17 which aligns with a similar opening in the end of the casing 11, providing an unobstructed passageway between the chambers 12 and 16.

The rear of the casing 11 which is the left hand side of the apparatus as viewed in Figs. 1 and 2, is open and is bolted to an open end of a horizontal auxiliary casing 18. The top of this auxiliary casing is sealed by a cover 19 which is bolted in position and which encloses the casing thus providing a chamber 21 which is in free communication with the chamber 12 of the casing 11. The sealing instrumentalities, which in the preferred disclosure are solder tipping devices, are housed in this chamber 21. The rear end of the auxiliary casing is supported on legs 22.

The combined and communicating chambers 12, 16, 21 provide an extensive can vacuumizing chamber which is maintained at other than normal atmospheric conditions through the medium of a suitable source of vacuum or pressure, such as a pump or the like which communicates with one end of a pipe 23. The other end of the pipe is threadedly engaged in the wall of the housing 15 and communicates with the chamber 16.

Cans are introduced into the vacuum chamber at the front of the casing 11 adjacent the closed end thereof. This part of the casing is provided with an opening 30 (Fig. 1) over which is bolted a semi-cylindrical valve seat 31 (see also Fig. 2) having a can entrance port 32. A cylindrical can entrance or feed-in valve 33 having a plurality of can pockets 34 is rotatably disposed in this valve seat. It is by means of this valve that cans are introduced into the vacuuming chamber, and atmosphere is substantially excluded.

The valve is mounted on a vertical shaft 35 journaled in suitable floating bearings 36, 37 secured to the top and bottom walls of a laterally extending gear housing 38. Housing 38 is bolted to one side of the pedestal 13 and is supported intermediate its ends by the bearing 37 which at its lower end is secured to the base 14. The valve is continuously rotated by suitable gear connections disposed in the gear housing 38 and pedestal 13. The gear connections are driven from a main source of power comprising a suitable electric motor 41 mounted on top of the seaming mechanism housing 15.

The cans to be vacuumized comprise tall cans $a$ having loosely applied covers $b$ and short cans $c$ having hermetically applied covers $d$ with central vent holes $e$. The cans are illustrated as rectangular in cross-section, although the machine is equally well adapted to handle round or other shaped cans.

These cans are brought into the machine in a continuous procession and in any desired or promiscuous order as to can height on an endless belt conveyor 45 between parallel guide rails 46 and are delivered onto a table 47 disposed in front of the valve 33 formed integrally with a bracket 52, bolted to the top of the housing 38. The machine end of the conveyor takes over a pulley 48 which is mounted on a horizontal shaft 49 journaled in opposed bearings 51 which depend from the bottom of the table.

The cans thus received on the table 47 are moved forward between the guides into the valve pockets 34 by a continuously rotating star-wheel 55 having curved arms 56 one of which engages behind each can as it leaves the conveyor and places it into one of the rotating valve pockets. Star-wheel 55 is mounted on the upper end of a vertical shaft 57 which is journaled in suitable bearings formed in the bracket 52. The shaft extends down into the gear housing 38 and is driven by the mechanism therein in any suitable manner and in time with the rotation of the feed-in valve 33.

Rotation of the valve 33 carries a pocketed can $a$ or $c$ to a position adjacent the entrance port 32 of the valve seat 31 where it is ejected from its pocket into the vacuum chamber 12 by a cam actuated arm 61. There are a plurality of these arms 61, one located in each valve pocket 34, disposed behind the can carried therein and mounted on the lower end of a vertical shaft 62 carried in bearings formed in the valve. The upper end of each shaft extends above the top of the valve and carries an arm 63 which at one end supports a cam roller 64. The roller engages within a groove 65 of a stationary cam 66, the groove being so shaped as to rock the shaft and the arm 61 when the valve rotates so as to eject a can from its valve pocket at the proper time. The cam 66 is supported over the top of the valve on one end of a bracket 67. The other end of the bracket is secured to a boss 68 formed on the top of the casing 11 adjacent the opening 30.

In the vacuum chamber the ejected can is received on a substantially rectangular, horizontal, platform 71 (Fig. 3) which extends nearly the full length and breadth of the interior of the combined casings 11, 18 and projects into the interior of the housing 15. The platform is provided with a depending peripheral flange 72 which is supported on a continuous rib 73 (Fig. 3) which is projected up from the bottom of the casings.

A can received on the platform 71 first engages against a stop lug 74 which is located at the entrance port of the valve seat 31 and which is formed as a part of a bracket 75 bolted to the top of the platform. The stop lug momentarily halts the can in its travel and at the same time properly locates it over the top of an endless chain conveyor 76 which picks it up and moves it between guide rails back and forth over the top of the platform in a tortuous path of travel so as to provide ample time for a full vacuumization of the can head space and its contents.

The conveyor 76 is provided with a plurality of spaced upwardly projecting studs or feed fingers 77. One of these studs engages behind each can as it is located over the chain and moves the can away from the lug 74 and along its path of travel. The chain conveyor is located and guided in a track or groove 78 (see also Fig. 3) formed in the top of the platform 71 and extends rearwardly and longitudinally of the platform for substantially its full length, then curves back along a parallel line, and so proceeds back and forth in a tortuous course in as many runs as may be desired. By way of example, six such runs are illustrated in the drawings.

At the curved ends of the track the conveyor chain takes over idler sprockets 79 which are seated within suitable recesses formed in the platform 71. Each sprocket is mounted on a vertical shaft 81 which is carried in bearings 82 formed in the platform.

One of the sprockets 79, preferably the one between the third and fourth runs of the conveyor chain as illustrated in Fig. 1 of the drawings, is utilized as a chain tightener. Its shaft bearing 82 is formed as a part of a horizontal slide 85 having a pair of lateral tongues 86 movable in the platform. The slide is held against vertical displacement by overhanging plates 91 which are bolted to the tops of the shoulders and which engage the upper surface of the tongues.

The sprocket and slide are held under spring tension operating to keep the chain taut by a coil spring 93 located in a channel 94 formed in the top of the platform. The spring is interposed between the bearing 82 and a web 95 (Fig. 1) formed in the channel and is held in position by a rod 96 which passes through its center. One end of the rod is threadedly engaged in the bearing 82 while its opposite end is slidably engaged and guided in the web 95.

The chain conveyor 76 is moved in time with the entrance of cans into the chamber which movement is effected by a drive sprocket 101. This sprocket is located along an unguided run of the chain intermediate the places where the chain enters the track 78 on the first run and where it leaves the track on the last run. This is shown in Fig. 1 in the casing 11. The sprocket is mounted on the upper end of a vertical shaft 102 which is carried in suitable bearings formed in the platform. The shaft extends down into the pedestal 13 and is driven in any suitable manner from the mechanism therein contained.

Suitable spaced and parallel guide rails 104 are provided on both sides of the chain track 78 and extend throughout the entire course of the track, being parallel therewith for guiding the moving cans. These guide rails rest on spacer blocks 106 (Fig. 3), the rails and blocks being secured in place by long screws 107 which extend through these parts and are threadedly engaged in the top of the platform. At the curved ends of the track the bearings 82 serve as inside can guides, the adjacent ends of the guide rails being secured to the bearings instead of to spacer blocks.

At the chain tightener device the curved guide rails move with the movement of the slide 85. The stationary guide rails 104 are broken at this device and their ends slidably engage and overlap the ends of independent curved guide rails. The ends of the outside guide rails overlap the ends of a curved rail 108 which is supported on lugs 109 projected up from a base plate 111. The plate is seated in a recess 112 formed in the top of the platform and its top surface is flush with the top of the platform so that the cans may readily move from one to the other. One end of the plate is dovetailed with the platform at the edge of the recess as at 114 to provide a continuous surface for the cans. The plate is formed as an integral part of the slide 85 so that as the slide moves the can suppport and the guide rail 108 moves with it. The ends of the inside guide rails 104 overlap the bearing 82 which serves as the inside movable rail.

As the cans travel upon the last run of the conveyor 76 they are ready for sealing at solder sealing station A. An operator at the station A outside of the chamber observes the cans, through a window 121, as they approach the station (Figs. 1 and 3). This window is hermetically clamped in a seat 122 surrounding an opening 123 provided in a dome 124 formed in the auxiliary chamber cover 19. An electric lamp 125 secured to the inside of the dome illuminates the chamber interior so that the operator may readily view the moving cans.

When a short can $c$ is sighted the operator stops the machine to cause the can to come to a stop at the station. This is effected by breaking an electric circuit which connects the motor 41 with any suitable source of power such as a generator 126 (see wiring diagram Fig. 1). The circuit includes a switch 127 which is positioned on the floor and is actuated by a foot treadle 128.

One side of the switch is connected by a wire 129 to one side of the motor 41 while the other side of the switch is connected by a wire 131 to one side of the generator. The generator and motor are connected together by a wire 132. Thus when the switch 127 is closed current flowing through the circuit causes the motor to operate. However, when the circuit is broken by opening the switch, the motor does not cease to operate immediately.

Provision is made for stopping the motor and thus the machine at a part of its cycle which upon starting again will offer the least resistance in overcoming the inertia of the machine parts. For this purpose when the switch 127 is opened the current is short circuited through another circuit which includes a switch 135 which is mounted on the bracket 67 associated with the entrance valve 33. One side of this switch is connected by a wire 136 to the wire 129 and the other side of the switch is connected by a wire 137 to the wire 131, thus forming a circuit which includes the motor but does not include the floor switch 127. The motor will not cease operating unless both these switches 127, 135 are open.

The switch 135 is periodically opened by a cam 139 having a plurality of peripheral projections 141 which engage against the movable element of the switch to cause it to open. The cam is adjustably mounted on a disc 142 (Fig. 2) which in turn is keyed to the end of the valve shaft 35 and is rotated thereby. By adjusting the cam to open the switch 135 at predetermined low resistance periods of the cycle, the machine is stopped in parts of the cycle where starting again is done rapidly, easily and efficiently while at the same time bringing the can to be soldered or otherwise sealed to rest in proper relation to the sealing station A.

While the machine is thus at rest the can c is manually sealed by a solder tipping operation effected by a mechanism housed in the dome 124 at the station A (Fig. 3). For this purpose there is provided a manually operated electric soldering iron 145 which is connected by wires 146 to a suitable source of power. The iron extends down into the vacuum chamber above the cans, through an opening 147 formed in the top of the dome and a boss 151 projecting up therefrom. It is frictionally held, so that it can be moved up and down, in a bore 152 of a movable ball 153. The ball is carried in a seat 154 in the boss 151 and a seat 155 in a clamp plate 156 which is bolted to the top of the boss. Thus the lower end of the iron may be moved from outside the chamber and in any direction to reach the can to be soldered and for a distance, according to the size of the hole, which size will be sufficient for the work to be done. The space illustrated in the parts 147, 151, is typical of any suitable space. The upper end of the iron is provided with a handle 157 for this purpose.

The end of the iron is moved into engagement with a pellet of solder f (Fig. 3) which has previously been deposited on the can adjacent the vent hole e, the solder being melted and spread over the hole, thus sealing the can against the admittance of air when it is again moved out into the atmosphere.

It should be understood that all cans, both short and tall, move past this solder tipping mechanism but it is only the short cans or those requiring a solder tipping operation that are operated upon. It has been found that an operator can become so adept at this soldering operation as to complete the sealing as the can is moving past the station. In this case the machine need not be stopped. We do not show herein means whereby the soldering operation may be performed automatically.

At the end of the last run of the conveyor 76 adjacent the opening 17 between the housing 15 and the casing 11, the chain moves out of its track 78 and at the same time positions each can adjacent a cam actuated feeding device (Fig. 1). Here horizontally spaced fingers 161 mounted on pivot studs 162 secured in the top of a rotating disc 163 are brought into play for further moving the cans. The disc is mounted on a vertical shaft 164 carried in suitable bearings 165 formed in the platform 71 and a can guide plate 166 secured to the platform. The shaft is driven in any suitable manner from the motor 41 in time with the other moving parts of the machine.

The fingers 161 are connected with arms 167 which at their outer ends carry cam rollers 168 engaging in a cam groove 169 formed in the guide plate 166. As the disc 163 is rotated it carries the rollers around the cam groove which moves the fingers, bringing them up behind the cans and into engagement therewith as they leave the chain conveyor. The cans are thus swept across the remaining part of the platform 71 between can guides formed by the curved edge of the plate 166 and a parallel curved guide rail 171 secured to the platform and forming a continuation of the inside rail 104 of the last can run.

The cans are moved into the chamber 16 (Fig. 1) of the housing 15 where the loose fitting covers b on the tall cans a are now automatically sealed in position. The platform 71 extends into the chamber 16 and as each can is moved thereover into the chamber it is positioned in a pocket 176 of an intermittently rotating turret 177 (see also Fig. 4) associated with the seaming mechanism B. The turret is keyed to a vertical shaft 178 which extends down through the platform and is carried in suitable bearings 179 formed in the housing 15. This shaft is intermittently rotated in any suitable manner by the motor 41 and in time with the other moving parts of the machine.

The stepped rotation of the turret first moves a pocketed can to a position under a suitable seaming head 181 (Figs. 1 and 4) having seaming rollers 182 for interlocking parts of the cover b with the can a in a suitable hermetic seam. The can during this movement is held in the pocket by upper and lower guide rails 183, 184 which are vertically spaced apart and held above the platform by spacer blocks 185. The entire assembly of rails and blocks are held in place by long screws 186 which pass through the parts and threadedly engage in the top of the platform at their lower end.

While under the seaming head the can is seated on a lifter plate 188 which is mounted on a vertical stem 189 carried in a bearing 191 formed in the housing 15. The lifter plate is raised by any suitable means in time with the other machine parts to lift the can into engagement with the seaming head for the seaming operation.

As the lifter plate rises, instrumentalities associated therewith act to properly locate the can in its pocket so that it will be in centralized alignment with the seaming head. These instrumentalities comprise a horizontal slide 193 (Figs. 4, 5, 6 and 7) having longitudinal tongues 194 projecting from each side thereof and which slide in grooves 195 of a T slot formed in a horizontal lug 196 extending out from one edge of the lifter pad. The end of the slide adjacent the can pocket is provided with a notch or recess 197 shaped to coincide with the contour of the can.

The slide is normally held away from the can by a coiled spring 198 located under the slide and having one end engaged in a horizontal bore 199 formed in the lug 196. The other end of the spring is held in a bore 201 formed in a lug 202 depending from the bottom of the slide. A roller 203 mounted on a pin 204 carried at the outer end of the slide, is thus kept in engagement with a stationary wall cam 205 secured to the housing 15. The cam surface is substantially vertical and at its upper end is flared inwardly toward the can in an inclined surface 206 which terminates in a short vertical surface 207.

The raising of the lifter plate causes the roller 203 to traverse this surface which first moves the slide into can engaging position against the resistance of the spring (as when on the inclined surface 206) and then holds the slide in engagement with the can (as when on the vertical surface 207). In this manner the can is centralized in its pocket and held firm at its lower end as shown in Fig. 5 while the can closing or seaming operation is being performed at its upper end.

After the closing operation the lifter plate 188 and its can are returned to their original lowered position which action also moves the centralizing slide 193 out of can engaging position. This movement places the can in readiness to be carried forward by the next stepped rotation of the turret 177. It should be understood that all cans whether tall or short pass through this seaming mechanism as just described. The seaming head is set to close the tall cans. Therefore the short cans being too short to engage the seaming head when raised by the lifter plate are carried through the can closing steps while the seaming head moves idly without any seaming operation being performed on them. It will be recalled that these short cans were sealed by solder tipping at the station A so that at this stage in the progress of the cans both tall and short cans are now completely sealed.

Succeeding step movements of the turret 177 carry the now fully vacuumized and closed cans out of the chamber 16. The cans still on the platform 71 are carried toward an opening 210 formed in the front of the housing 15. A semi-cylindrical valve seat 211 having a can passageway 212 is bolted in place over the opening and retains a cylindrical exit valve 214 having a plurality of can pockets 215 similar to the entrance valve 33. The valve is mounted on a vertical shaft 216 which is journaled in suitable floating bearings formed in the front of the housing 15, and is continuously rotated by the motor 41 in timed relation with the other moving parts.

As the cans are moved through the housing opening 210 they engage against a stationary can guide 218 which together with the movement of the turret positions a can into a passing valve pocket 215 as the valve rotates. The pocketed can is thus carried out from a sub-atmospheric condition into the atmosphere.

At the proper time in the rotation of the valve the can is ejected from its pocket. As in the entrance valve, the exit valve is provided with can ejecting fingers 221 which are disposed in each pocket 215 behind the can. Each finger is mounted on a vertical shaft 222 carried in suitable bearings formed in the valve. At its upper end the shaft carries an arm 223 which in turn carries a cam roller 224. The rollers engage in a groove 225 formed in a stationary cam 226 positioned over the top of the valve and secured to an overhanging bracket 227 one end of which is secured to the valve seat 211. Thus as the rollers are carried along the cam groove with the rotation of the valve, the arms 223 and fingers 221 are actuated at the proper time to eject a can from its pocket.

The ejected can is received on a table 228 and between curved guides comprising an inner plate 229 and an outer guide rail 231, both of which are secured to the top of the table. The table partly surrounds the front of the valve and is supported on a suitable bracket associated with the base 14.

The cans are moved away from the valve immediately upon their ejection by a star wheel 232 which is mounted on a vertical shaft 233 carried in suitable bearings formed in the table. This shaft is continuously rotated in any suitable manner in time with the other moving parts of the machine.

As the star-wheel rotates its arms engage behind the ejected cans and sweep them through a curved path of travel between the guides 229, 231 and onto a continuously moving endless belt conveyor 235. The machine end of this conveyor takes over a suitable pulley rotatably carried in the table 228. The cans are thus carried away to any desired place of discharge between guides comprising the rail 231 which extends parallel with the conveyor and a similarly parallel guide 236 one end of which is bolted to the guide plate 229.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In an apparatus for vacuumizing and sealing containers having different height dimensions, the combination of a casing providing a vacuum chamber for accommodating tall and short containers, seaming instrumentalities in said chamber for sealing said tall containers, hand operated soldering instrumentalities also in said chamber for sealing said short containers, and conveyor means disposed in said chamber for progressively and simultaneously moving said tall and short containers to said respective instrumentalities for sealing them.

2. In an apparatus for vacuumizing and sealing different types of containers, the combination of a casing providing a vacuum chamber, seaming instrumentalities in said chamber for sealing one type of containers, soldering instrumentalities operable at will for sealing another type of containers and comprised in the same vacuum chamber with different types of containers, and conveyor means disposed in said chamber for moving containers into sealing position relative to said instrumentalities, for the sealing of said different containers respectively.

3. In an apparatus for vacuumizing and sealing containers, the combination of a casing providing a vacuum chamber, an entrance valve having a plurality of container pockets and associated with said casing for delivering containers of varying dimensions into said chamber, an exit valve having a plurality of container pockets and also associated with said casing for delivering said containers from said chamber, seaming instrumentalities in said chamber for automatically sealing all containers of one uniform dimension, soldering instrumentalities in said chamber and manually operable for sealing all containers of another uniform dimension, and conveyor means disposed in said chamber for moving all containers therethrough from said entrance valve to said seaming and soldering instrumentalities respectively for the sealing of said containers, and to said exit valve.

4. In an apparatus for vacuumizing and sealing containers of varying dimensions, the combination of a casing providing a vacuum chamber, seaming instrumentalities in said chamber for sealing containers of one uniform dimension, hand operated soldering instrumentalities also in said chamber and manually operable for sealing containers of another uniform dimension, continuously movable conveyor means disposed in said chamber for moving containers to said seaming and soldering instrumentalities respectively for the sealing of said containers, and means for stopping said conveyor means and a said container at said soldering instrumentalities for a manual soldering operation.

5. In an apparatus for vacuumizing and sealing containers of varying dimensions, the combination of a casing providing a vacuum chamber, soldering instrumentalties in said chamber and manually operable for sealing containers of a given uniform dimension, seaming instrumentalities also in said chamber and automatically operative for sealing containers of a different uniform dimension, continuously movable conveyor means disposed in said chamber for moving all containers to said soldering and seaming instrumentalities respectively to be sealed thereby, and means for stopping at will said conveyor and a selected container thereon at a predetermined location relative to the soldering instrumentalities and at a determined period of the cycle of the engine, to permit a soldering operation to be performed on said stopped container.

6. In an apparatus for vacuumizing and sealing containers, the combination of a casing providing a vacuum chamber, a plurality of different container sealing instrumentalities in said chamber for respectively sealing containers of selected dimensions, the containers of a selected dimension requiring the use of one sealing instrumentality and the containers of another dimension requiring the use of another sealing instrumentality, and conveyor means disposed in said chamber for moving said containers therethrough and to said instrumentalities for sealing them.

7. In an apparatus for vacuumizing and sealing containers, the combination of a casing providing a plurality of vacuum chambers in communication with each other, a containing sealing instrumentality in one of said chambers for performing sealing operations on containers of a predetermined dimension, and a container sealing instrumentality in another of said chambers for performing sealing operations on containers of a different uniform dimension, and continuously movable conveyor means disposed in said chambers for moving said containers therethrough and to said instrumentalities for sealing them.

8. In an apparatus for vacuumizing and sealing different types of containers, the combination of a casing providing a vacuum chamber, manually operated sealing instrumentalities in said chamber for sealing containers of one dimension, automatically operated sealing instrumentalties also in said chamber for sealing containers of another and different dimension, conveyor means disposed in said chamber for moving said containers therethrough and past said instrumentalities for sealing, and means associated with said chamber for visually observing the passage of said containers therethrough to permit the sealing of said first mentioned class of containers by said manual sealing instrumentalities.

9. In an apparatus for vacuumizing and sealing different types of containers, the combination of a casing providing a vacuum chamber, manually operated instrumentalities for sealing containers of one size by solder tipping while in said chamber, automatic instrumentalities for seaming containers of another size while in said chamber, and continuously movable conveyor means disposed in said chamber for moving all of said containers therethrough simultaneously and to each of said instrumentalities respectively, and means for visually observing said solder tipping sealing operation.

10. In an apparatus for vacuumizing and sealing containers, the combination of a casing providing a plurality of connected vacuum chambers, seaming instrumentalities in one of said chambers, manually operable soldering instrumentalities in another of said chambers, one of said chambers being extensive and containing means for conveying the containers over a tortuous and prolonged course of travel in said chamber to insure thorough vacuumizing and for moving said containers to said instrumentalities respectively in a continuous procession, one of said instrumentalities sealing containers of one dimension and the other instrumentalities sealing containers of another dimension as the procession of containers passes through said chambers.

11. In an apparatus for vacuumizing and sealing containers, the combination of a casing providing a vacuum chamber, seaming instrumentalities in said chamber, hand operated soldering instrumentalities operable at will and comprised in the vacuum chamber with the containers, and conveyor means continuously movable and disposed in said chamber for moving containers to said instrumentalities so that said containers of one dimension are sealed by said seaming instrumentalities and containers of another dimension may be manually sealed by said soldering instrumentalities.

CLIFFORD TITCHEN.
WILHELM BOEHL.